US008902699B2

(12) United States Patent
Söllner et al.

(10) Patent No.: US 8,902,699 B2
(45) Date of Patent: Dec. 2, 2014

(54) METHOD FOR SEPARATING UP AND DOWN PROPAGATING PRESSURE AND VERTICAL VELOCITY FIELDS FROM PRESSURE AND THREE-AXIAL MOTION SENSORS IN TOWED STREAMERS

(75) Inventors: Walter Söllner, Oslo (NO); Stian Hegna, Hovik (NO)

(73) Assignee: PGS Geophysical AS, Oslo (NO)

( * ) Notice: Subject to any disclaimer, the term of this patent is extended or adjusted under 35 U.S.C. 154(b) by 1283 days.

(21) Appl. No.: 12/798,136

(22) Filed: Mar. 30, 2010

(65) Prior Publication Data
US 2011/0242937 A1 Oct. 6, 2011

(51) Int. Cl.
G01V 1/32 (2006.01)
G01V 1/38 (2006.01)
G01V 1/18 (2006.01)

(52) U.S. Cl.
CPC ...... G01V 1/325 (2013.01); G01V 1/38 (2013.01); G01V 2210/142 (2013.01); G01V 2210/6161 (2013.01); G01V 2210/48 (2013.01); G01V 1/189 (2013.01)
USPC .............................................. 367/22; 702/18

(58) Field of Classification Search
CPC ................ G01V 2210/142; G01V 2210/6161; G01V 2210/48; G01V 1/38; G01V 1/325; G01V 1/189
USPC ........................................ 367/21, 22; 702/18
See application file for complete search history.

(56) References Cited

U.S. PATENT DOCUMENTS

| 4,752,916 A * | 6/1988 | Loewenthal ..................... 367/24 |
| 4,979,150 A | 12/1990 | Barr | |
| 5,365,492 A | 11/1994 | Dragoset, Jr. | |
| 5,396,472 A * | 3/1995 | Paffenholz ....................... 367/24 |
| 5,400,299 A * | 3/1995 | Trantham ........................ 367/38 |
| 5,754,492 A | 5/1998 | Starr | |
| 6,477,470 B2 | 11/2002 | Fokkema et al. | |
| 6,654,693 B2 | 11/2003 | Sen et al. | |
| 6,775,618 B1 * | 8/2004 | Robertsson et al. ............ 702/14 |
| 6,894,948 B2 | 5/2005 | Brittan et al. | |
| 7,058,184 B1 * | 6/2006 | Hickling ......................... 381/92 |

(Continued)

FOREIGN PATENT DOCUMENTS

EP  0 414 344 A2  2/1991
EP  0 851 243 A2  7/1998

(Continued)

OTHER PUBLICATIONS

Jon Claerbout, Chapter 9: "Mathematical Physics in Stratified Media", of "Fundamentals of Geophysical Data Processing", (1976), pp. 163-183.

(Continued)

Primary Examiner — Isam Alsomiri
Assistant Examiner — Ari M Diacou

(57) ABSTRACT

A measured pressure field, a measured vertical velocity field, and two measured orthogonal horizontal velocity fields are obtained. A programmable computer is used to perform the following. A scaling factor is determined from water acoustic impedance, the measured pressure field, and the horizontal velocity fields. One of the measured pressure field and measured vertical velocity field is combined with one of the measured vertical velocity field scaled by the scaling factor and the measured pressure field scaled by the scaling factor, generating one of up-going and down-going pressure and velocity wavefields.

44 Claims, 6 Drawing Sheets

(56) References Cited

U.S. PATENT DOCUMENTS

| | | | |
|---|---|---|---|
| 7,123,543 B2* | 10/2006 | Vaage et al. | 367/24 |
| 7,218,573 B1* | 5/2007 | Laake | 367/70 |
| 7,319,636 B2* | 1/2008 | Robertsson et al. | 367/21 |
| 7,336,561 B2 | 2/2008 | Borresen | |
| 7,359,283 B2 | 4/2008 | Vaage et al. | |
| 7,646,672 B2 | 1/2010 | Kluver | |
| 7,684,281 B2 | 3/2010 | Vaage et al. | |
| 7,768,869 B2 | 8/2010 | Van Den Berg et al. | |
| 7,957,906 B2* | 6/2011 | Turnbull | 702/17 |
| 8,116,166 B2* | 2/2012 | Robertsson et al. | 367/24 |
| 8,456,950 B2* | 6/2013 | Hegna | 367/24 |
| 2004/0230389 A1* | 11/2004 | Adler et al. | 702/66 |
| 2005/0013194 A1* | 1/2005 | Vaage et al. | 367/24 |
| 2006/0239117 A1* | 10/2006 | Singh et al. | 367/20 |
| 2007/0265785 A1* | 11/2007 | Robertsson | 702/14 |
| 2008/0089174 A1* | 4/2008 | Sollner et al. | 367/21 |
| 2008/0253227 A1* | 10/2008 | Sollner | 367/21 |
| 2009/0067285 A1 | 3/2009 | Robertsson et al. | |
| 2010/0027375 A1 | 2/2010 | Barr, Jr. | |
| 2010/0054081 A1 | 3/2010 | Barr, Jr. et al. | |
| 2010/0091610 A1 | 4/2010 | Sollner | |
| 2010/0161235 A1* | 6/2010 | Ikelle | 702/17 |
| 2010/0182873 A1 | 7/2010 | Kluver | |
| 2010/0274492 A1* | 10/2010 | Rentsch et al. | 702/14 |
| 2010/0302909 A1* | 12/2010 | Muyzert et al. | 367/178 |
| 2012/0026829 A1* | 2/2012 | Hegna | 367/21 |
| 2013/0182536 A1* | 7/2013 | Vassallo et al. | 367/24 |

FOREIGN PATENT DOCUMENTS

| | | |
|---|---|---|
| EP | 2 081 054 A2 | 7/2009 |
| GB | 2 442 854 A | 4/2008 |
| GB | 2442854 | 4/2008 |
| RU | 2246122 C1 | 2/2005 |

OTHER PUBLICATIONS

Lasse Amundsen, "Wave-based filtering of marine point-source data", Geophysics, vol. 58, No. 9, (1993), pp. 1335-1348.

Chris H. Chapman, Chapter 5: "Asymptotic ray theory", of "Fundamentals of Seismic Wave Propagation", (2004), pp. 134-156.

Judith Thomas, European Search Report and Written Opinion, Publication Date: Oct. 12, 2011.

Johan O. A. Robertsson, et al., (2008), "On the use of multicomponent streamer recordings for reconstruction of pressure wavefields in the crossline direction", Geophysics, V.

L. I. Popova, Eurasian Search Report, Search Date: Aug. 31, 2011.

* cited by examiner

METHOD FOR SEPARATING UP AND DOWN PROPAGATING PRESSURE AND VERTICAL VELOCITY FIELDS FROM PRESSURE AND THREE-AXIAL MOTION SENSORS IN TOWED STREAMERS

CROSS-REFERENCES TO RELATED APPLICATIONS

Not Applicable

FEDERALLY SPONSORED RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting. More particularly, the invention relates to the field of imaging dual-sensor marine seismic streamer data.

2. Description of the Related Art

In the oil and gas industry, geophysical prospecting is commonly used to aid in the search for and evaluation of subsurface earth formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey. In a land-based seismic survey, a seismic signal is generated on or near the earth's surface and then travels downward into the subsurface of the earth. In a marine seismic survey, the seismic signal may also travel downward through a body of water overlying the subsurface of the earth. Seismic energy sources are used to generate the seismic signal which, after propagating into the earth, is at least partially reflected by subsurface seismic reflectors. Such seismic reflectors typically are interfaces between subterranean formations having different elastic properties, specifically sound wave velocity and rock density, which lead to differences in acoustic impedance at the interfaces. The reflected seismic energy is detected by seismic sensors (also called seismic receivers) at or near the surface of the earth, in an overlying body of water, or at known depths in boreholes. The seismic sensors generate signals, typically electrical or optical, from the detected seismic energy, which are recorded for further processing.

The resulting seismic data obtained in performing a seismic survey, representative of earth's subsurface, are processed to yield information relating to the geologic structure and properties of the subsurface earth formations in the area being surveyed. The processed seismic data are processed for display and analysis of potential hydrocarbon content of these subterranean formations. The goal of seismic data processing is to extract from the seismic data as much information as possible regarding the subterranean formations in order to adequately image the geologic subsurface. In order to identify locations in the Earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the earth in depth or time.

The image of the structure of the Earth's subsurface is produced in order to enable an interpreter to select locations with the greatest probability of having petroleum accumulations. To verify the presence of petroleum, a well must be drilled. Drilling wells to determine whether petroleum deposits are present or not, is an extremely expensive and time-consuming undertaking. For that reason, there is a continuing need to improve the processing and display of the seismic data, so as to produce an image of the structure of the Earth's subsurface that will improve the ability of an interpreter, whether the interpretation is made by a computer or a human, to assess the probability that an accumulation of petroleum exists at a particular location in the Earth's subsurface.

The appropriate seismic sources for generating the seismic signal in land seismic surveys may include explosives or vibrators. Marine seismic surveys typically employ a submerged seismic source towed by a ship and periodically activated to generate an acoustic wavefield. The seismic source generating the wavefield may be of several types, including a small explosive charge, an electric spark or arc, a marine vibrator, and, typically, a gun. The seismic source gun may be a water gun, a vapor gun, and, most typically, an air gun. Typically, a marine seismic source consists not of a single source element, but of a spatially-distributed array of source elements. This arrangement is particularly true for air guns, currently the most common form of marine seismic source.

The appropriate types of seismic sensors typically include particle velocity sensors, particularly in land surveys, and water pressure sensors, particularly in marine surveys. Sometimes particle displacement sensors, particle acceleration sensors, or pressure gradient sensors are used in place of or in addition to particle velocity sensors. Particle velocity sensors and water pressure sensors are commonly known in the art as geophones and hydrophones, respectively. Seismic sensors may be deployed by themselves, but are more commonly deployed in sensor arrays. Additionally, pressure sensors and particle motion sensors may be deployed together in a marine survey, collocated in pairs or pairs of arrays.

In a typical marine seismic survey, a seismic survey vessel travels on the water surface, typically at about 5 knots, and contains seismic acquisition equipment, such as navigation control, seismic source control, seismic sensor control, and recording equipment. The seismic source control equipment causes a seismic source towed in the body of water by the seismic vessel to actuate at selected times. Seismic streamers, also called seismic cables, are elongate cable-like structures towed in the body of water by the seismic survey vessel that tows the seismic source or by another seismic survey ship. Typically, a plurality of seismic streamers are towed behind a seismic vessel. The seismic streamers contain sensors to detect the reflected wavefields initiated by the seismic source and reflected from reflecting interfaces. Conventionally, the seismic streamers contain pressure sensors such as hydrophones, but seismic streamers have been proposed that contain water particle velocity sensors such as geophones or particle acceleration sensors such as accelerometers, in addition to hydrophones. The pressure sensors and particle motion sensors may be deployed in close proximity, collocated in pairs or pairs of arrays along a seismic cable. An alternative to having the geophone and hydrophone co-located, is to have sufficient spatial density of sensors so that the respective wavefields recorded by the hydrophone and geophone can be interpolated or extrapolated to produce the two wavefield signals at the same location.

After the reflected wave reaches the streamer cable, the wave continues to propagate to the water/air interface at the water surface, from which the wave is reflected downwardly, and is again detected by the hydrophones in the streamer cable. The water surface is a good reflector and the reflection coefficient at the water surface is nearly unity in magnitude and is negative in sign for pressure signals. The waves reflected at the surface will thus be phase-shifted 180 degrees relative to the upwardly propagating waves. The downwardly propagating wave recorded by the receivers is commonly referred to as the surface reflection or the "ghost" signal. Because of the surface reflection, the water surface acts like a filter, which creates spectral notches in the recorded signal, making it difficult to record data outside a selected bandwidth. Because of the influence of the surface reflection, some frequencies in the recorded signal are amplified and some frequencies are attenuated.

A particle motion sensor, such as a geophone, has directional sensitivity, whereas a pressure sensor, such as a hydrophone, does not. Accordingly, the upgoing wavefield signals detected by a geophone and hydrophone located close together will be in phase, while the downgoing wavefield signals will be recorded 180 degrees out of phase. Various techniques have been proposed for using this phase difference to reduce the spectral notches caused by the surface reflection. Conventional techniques for deghosting often include combining the pressure and vertical particle velocity wavefields to separate one of the pressure or vertical particle velocity wavefields into up-going and down-going wavefield components.

The up-going and down-going pressure wavefields are typically obtained by combining the measurements of a pressure wavefield and a vertical particle velocity wavefield. For example, the up-going pressure wavefield is given by subtracting the pressure wavefield from the scaled vertical velocity field. The scaling is composed of the density and local water velocity at the sensor divided by the cosine of the incidence angle of the measured event. The division by the cosine of the incidence angle converts the up-going vertical velocity wavefield into an omni-directional wavefield that is, after multiplication by the local water impedance, equal in absolute value to the measured pressure wavefield. The sign is –1 because the upwards propagation of the vertical velocity wavefield is in the opposite direction to the conventional orientation of the vertical velocity sensor.

The needed incidence angle dependent scaling is most conveniently applied in the frequency-wavenumber domain, in which every frequency-wavenumber component of the wavefield representing one plane wave is scaled by the corresponding factor. This approach depends on densely sampled data in both the in-line and cross-line directions. Although in-line sampling is typically sufficiently dense in towed streamer seismic data acquisition, cross-line sampling is usually not. This dense sampling assumption can be relaxed to some extent by determining the needed angles from scanning the low frequency content of locally coherent events in the space-time domain. However, a solution handling the full seismic bandwidth of the complete angle range is still desired.

Thus, a need exists for a method for separating the pressure or vertical velocity fields into up-going and down-going wavefield components without requiring dense spatial sampling, especially in the cross-line direction, and without requiring knowledge of the incidence angles.

BRIEF SUMMARY OF THE INVENTION

The invention is a method for separating pressure and vertical velocity fields measured in towed streamers into up-going and down-going wavefields. A programmable computer is used to perform the following. A measured pressure field, a measured vertical velocity field, and two measured orthogonal horizontal velocity fields are obtained. A scaling factor is determined from water acoustic impedance, the measured pressure field, and the horizontal velocity fields. One of the measured pressure field and measured vertical velocity field is combined with one of the measured vertical velocity field scaled by the scaling factor and the measured pressure field scaled by the scaling factor, generating one of up-going and down-going pressure and velocity wavefields.

BRIEF DESCRIPTION OF THE DRAWINGS

The invention and its advantages may be more easily understood by reference to the following detailed description and the attached drawings, in which.

Figure 1:
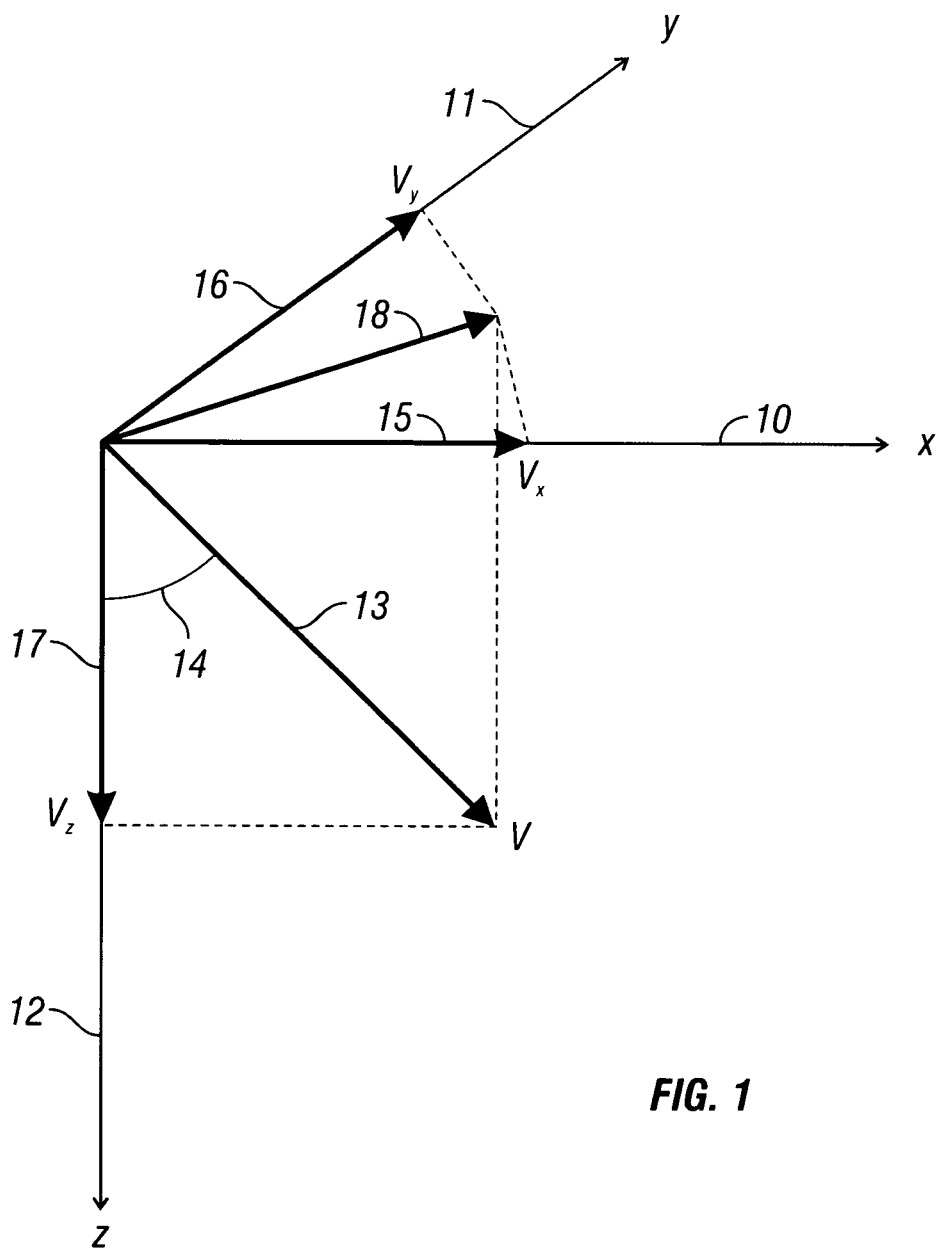
FIG. 1 shows the geometry of the velocity vector and its Cartesian components.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

The invention is a method for separating pressure and vertical velocity fields into up- and down-going wavefields in a marine environment. A pressure field, a vertical velocity field, and two orthogonal horizontal velocity fields are measured in a multi-component towed streamer. A scaling factor required for separating the pressure field and vertical velocity field at each multi-component location is computed from water acoustic impedance, the two measured horizontal velocity fields, and the measured pressure field. By including the two measured horizontal velocity fields, knowledge of the incidence angle is eluded in the wavefield separation. This leads to a local decomposition in space time domain at each multi-component sensor station independently and thus relaxes the dense spatial sampling assumption. The wavefield separation of the invention can be applied optionally after processing steps which preserve the ratio between the horizontal velocity fields and the pressure field.

Particle motion sensors are typically particle velocity sensors, but other particle motion sensors, including particle acceleration sensors, may be used instead of particle velocity sensors in dual sensor streamers. Particle velocity sensors are commonly known in the art as geophones and particle acceleration sensors are commonly known in the art as accelerometers. The present invention will be described with embodiments employing geophones, but this sensor choice is for simplicity of illustration only and is not intended to be a restriction of the invention.

A particle motion sensor such as a geophone has directional sensitivity (with positive deflection in the vertical +z direction, by convention) whereas a pressure sensor such as a hydrophone does not. A pressure sensor is omni-directional. The water/air interface at a calm water surface is an excellent reflector of seismic waves and so the reflection coefficient at the water surface is nearly unity in magnitude and negative in sign for pressure signals. Thus, the downwardly propagating wavefields reflected from the water surface will be phase-shifted 180° relative to the upwardly propagating wavefields. Accordingly, the up-going wavefield signal components detected by a geophone and a hydrophone located close together will be recorded 180° out of phase, while the down-going wavefield signal components will be recorded in phase, independently of the sea surface condition. In an alternative sign convention, not used in this illustration of the invention, the up-going wavefield signal components would be recorded in phase, while the down-going wavefield signal components would be recorded 180° out of phase.

While a hydrophone records the total wavefield omni-directionally, a vertical geophone, as typically utilized in seismic processing, only records the vertical component of the wavefield uni-directionally. The vertical component of the wavefield will only be equal to the total wavefield for signals that happen to be propagating vertically downward. If θ is the angle of incidence between the signal wave front and the sensor orientation, then vertical upward propagation is conventionally defined by incidence angle θ=0.

Thus, in conventional techniques, the recorded signal $V_z$ of a vertical geophone, a seismic event with incidence angle θ, needs to be adjusted to match the recorded pressure wavefield P of a hydrophone. This adjustment is typically made by scaling the vertical geophone signal $V_z$ by an appropriate amplitude scaling factor, such as:

$$\frac{\rho c}{\cos(\theta)}, \quad (1)$$

in the space-time domain. Here, the factor ρc is the acoustic impedance of water, where ρ is the density of water and c is the acoustic velocity of water.

Now the scaled vertical velocity field can be properly combined with the pressure field to give the up-going and down-going pressure wavefields $P^u$ and $P^d$. This is conventionally done as follows:

$$P^u = \frac{1}{2}\left[P - \frac{\rho c}{\cos(\theta)} V_z\right] \quad (2)$$

and $$P^d = \frac{1}{2}\left[P + \frac{\rho c}{\cos(\theta)} V_z\right]. \quad (3)$$

There is incidence angle dependence in both of Equations (2) and (3).

Similarly, the properly scaled pressure field can be properly combined with the vertical velocity field to give the up-going and down-going vertical velocity wavefields $V_z^u$ and $V_z^d$. This is conventionally done as follows:

$$V^u = \frac{1}{2}\left[V_z - \frac{\cos(\theta)}{\rho c} P\right] \quad (4)$$

and $$V^d = \frac{1}{2}\left[V_z + \frac{\cos(\theta)}{\rho c} P\right] \quad (5)$$

Again, as in Equations (2) and (3) above, there is incidence angle dependence in both of Equations (4) and (5).

In the frequency-wavenumber domain, the amplitude scaling factor can be expressed as:

$$\frac{\rho \omega}{k_z}, \quad (6)$$

where $$k_z = \sqrt{\frac{\omega^2}{c^2} - k_x^2 - k_y^2} \quad (7)$$

is the vertical wavenumber, ω=2πf is the angular frequency for frequency f, and $k_x$ and $k_y$ are the horizontal wavenumbers in two orthogonal horizontal directions. Typically, the two horizontal directions would be chosen in the in-line and cross-line directions of the marine seismic survey.

Alternatively, in the plane-wave domain, the amplitude scaling factor can be expressed as:

$$\frac{\rho}{p_z}, \quad (8)$$

where $$p_z = \sqrt{\frac{1}{c^2} - p_x^2 - p_y^2} \quad (9)$$

is the vertical slowness and $p_x$ and $p_y$ are the horizontal slownesses in two orthogonal horizontal directions.

In other alternative embodiments, the amplitude scaling factor can be obtained as a spatial filter in the space-time domain by applying an inverse Fourier transform to the frequency-wavenumber domain representation of the amplitude scaling factor in Equation (6) or by applying an inverse Radon transform to the plane-wave representation of the amplitude scaling factor in Equation (8).

Wavefields, such as the pressure wavefield P and the vertical velocity wavefield $V_z$, comprise an up-going wavefield component and a down-going wavefield component. For example, the pressure wavefield P comprises an up-going wavefield component $P^u$ and a down-going wavefield component $P^d$ as follows:

$$P = P^d + P^u. \quad (10)$$

Similarly, the vertical velocity wavefield $V_z$ comprises an up-going wavefield component $V_z^u$ and a down-going wavefield component $V_z^d$ as follows:

$$V_z = V_z^d + V_z^u. \quad (11)$$

Assume that the vertical and two orthogonal horizontal particle velocity components are known from measurement, in addition to the pressure wavefield. The particle velocity components may be calculated by rotation from an initially different coordinate system. Then, by the method of the invention, the up-going and down-going components of the pressure and vertical velocity fields can be determined without knowledge of incidence angles.

FIG. 1 shows the geometry of the velocity vector and its Cartesian components. A Cartesian coordinate system of axes is shown, designated as the x, y, and z directions, designated by the reference numerals 10, 11, and 12, respectively. Here the z-axis 12, corresponding to depth, is oriented with positive values in the downward direction, by convention. The velocity vector V 13 is oriented making an angle, the incidence angle θ 14, with the vertical z-axis 12. The Cartesian components $V_x$, $V_y$, and $V_z$, of the velocity vector V 13 are designated by reference numerals 15, 16, and 17, respectively. Thus, the absolute value of the vertical velocity component $V_z$ 17 is given by:

$$|V_z| = |V|\cos(\theta) \tag{12}$$

where the magnitude |V| of the velocity vector V 13 is given by:

$$|V| = \sqrt{V_x^2 + V_y^2 + V_z^2}. \tag{13}$$

The horizontal component 18 of the velocity vector V 13 can be decomposed into the horizontal velocity fields $V_x$ 15 and $V_y$ 16.

Thus, if the velocity components $V_x$, $V_y$, and $V_z$ are measured, then the angle-dependent scaled vertical velocity field in Equation (1) can be replaced by the signed, scaled magnitude of the velocity vector, using Equation (12), yielding:

$$\frac{\rho c}{\cos(\theta)} V_z = \rho c \ \text{sign}(V_z)|V|, \tag{14}$$

where ρ is water density and c is local water velocity, and the sign of $V_z$ is given by:

$$\frac{V_z}{|V_z|} \equiv \text{sign}(V_z) = \begin{cases} -1, & \text{for up-going wavefields, and} \\ +1, & \text{for down-going wavefields.} \end{cases} \tag{15}$$

The sign ($V_z$) term is required to retain the directionality of $V_z$ on the left hand side of Equation (14) with the omni-directional wavefield |V| on the right hand side of Equation (14). The right hand side of Equation (14) has no incidence angle dependence. Knowledge of the incidence angle is thus eluded by using measured velocity components instead.

Similarly, for pressure:

$$\frac{\cos(\theta)}{\rho c} P = \frac{1}{\rho c} \frac{|V_z|}{|V|} P \tag{16}$$

Substituting Equation (14) into Equation (2) yields a new way to calculate the up-going and down-going pressure wavefield $P^u$:

$$P^u = \frac{1}{2}[P - \rho c \ \text{sign}(V_z)|V|]. \tag{17}$$

By Equation (15), Equation (17) is equivalent to:

$$P^u = \frac{1}{2}\left[P - \frac{\rho c |V|}{|V_z|} V_z\right]. \tag{18}$$

Similarly, substituting Equation (14) into Equation (3) yields a new way to calculate the down-going pressure wavefield $P^d$:

$$P^d = \frac{1}{2}[P + \rho c \ \text{sign}(V_z)|V|]. \tag{19}$$

By Equation (15), Equation (19) is equivalent to:

$$P^d = \frac{1}{2}\left[P + \frac{\rho c |V|}{|V_z|} V_z\right]. \tag{20}$$

There is no incidence angle dependence in any of Equations (17) through (20).

Substituting Equation (16) into Equation (4) yields a new way to calculate the up-going and down-going velocity wavefield $V^u$:

$$V^u = \frac{1}{2}\left[V_z - \frac{|V_z|}{\rho c |V|} P\right]. \tag{21}$$

Similarly, substituting Equation (16) into Equation (5) yields a new way to calculate the down-going velocity wavefield $V^d$:

$$V^d = \frac{1}{2}\left[V_z + \frac{|V_z|}{\rho c |V|} P\right]. \tag{22}$$

Again, as in Equations (17) through (20) above, there is no incidence angle dependence in either of Equations (21) and (22).

In the following illustrated embodiments, the invention applies to measured fields obtained from acquired seismic data. In general, the word "obtained" should be interpreted broadly to include retrieving the measured fields from storage, such as, for example, from computer memory or other computer readable storage media such as tapes, disks, and hard drives.

Figure 2:
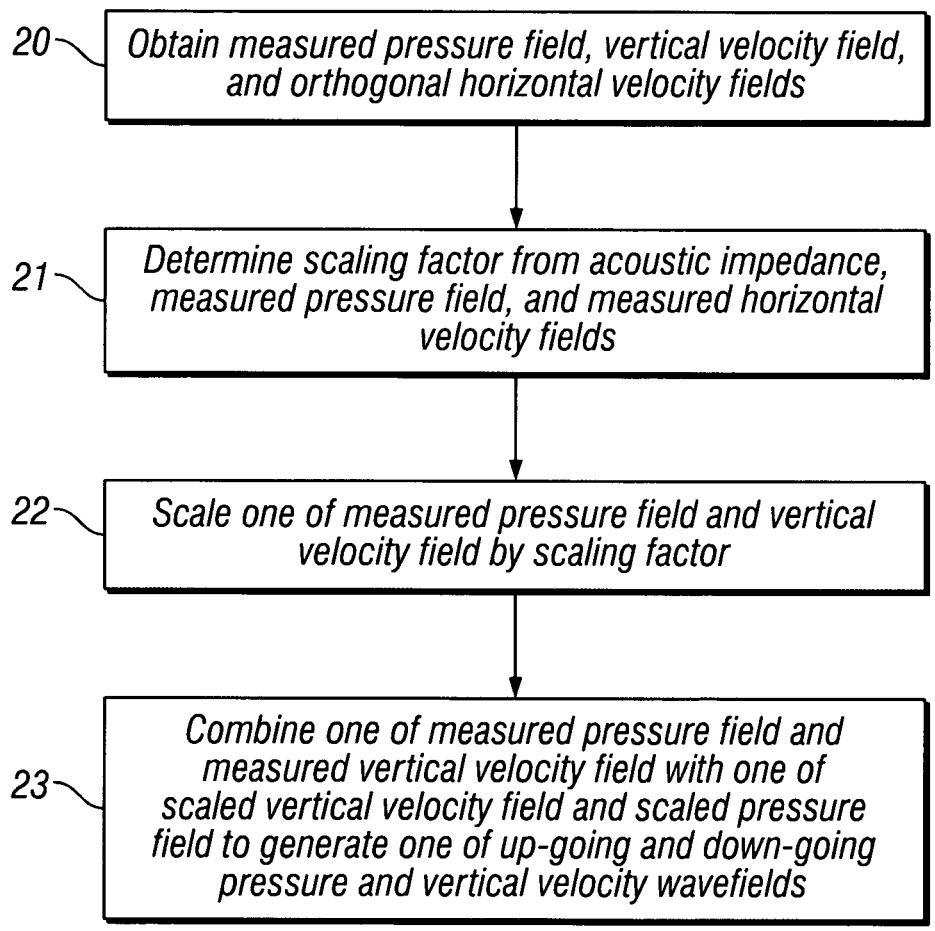
FIG. 2 is a flowchart illustrating an embodiment of the invention for determining up-going and down-going pressure and velocity wavefields.

FIG. 2 is a flowchart illustrating an embodiment of the invention for determining up-going and down-going pressure and velocity wavefields. This general embodiment covers the cases shown in Equations (17) to (22) above.

At block 20, a measured pressure field P, a measured vertical velocity field $V_z$, and two measured orthogonal horizontal velocity fields $V_x$ and $V_y$ are obtained.

At block 21, a scaling factor is determined from the water acoustic impedance ρc, the measured pressure field P from block 20, and the measured horizontal velocity fields $V_x$ and $V_y$ from block 20.

At block 22, one of the measured pressure field P and the vertical velocity field $V_z$ is scaled by the scaling factor from block 21.

At block 23, one of the measured pressure field P from block 20 and the measured vertical velocity field $V_z$ from block 20 is combined with one of the scaled vertical velocity field from block 22 and the scaled pressure field from block 22. This generates one of the up-going and down-going pressure and velocity wavefields $P^u$, $P^d$, $V^u$, and $V^d$ at the measurement position. This method of the invention does not require any knowledge of the incidence angles.

Figure 3:
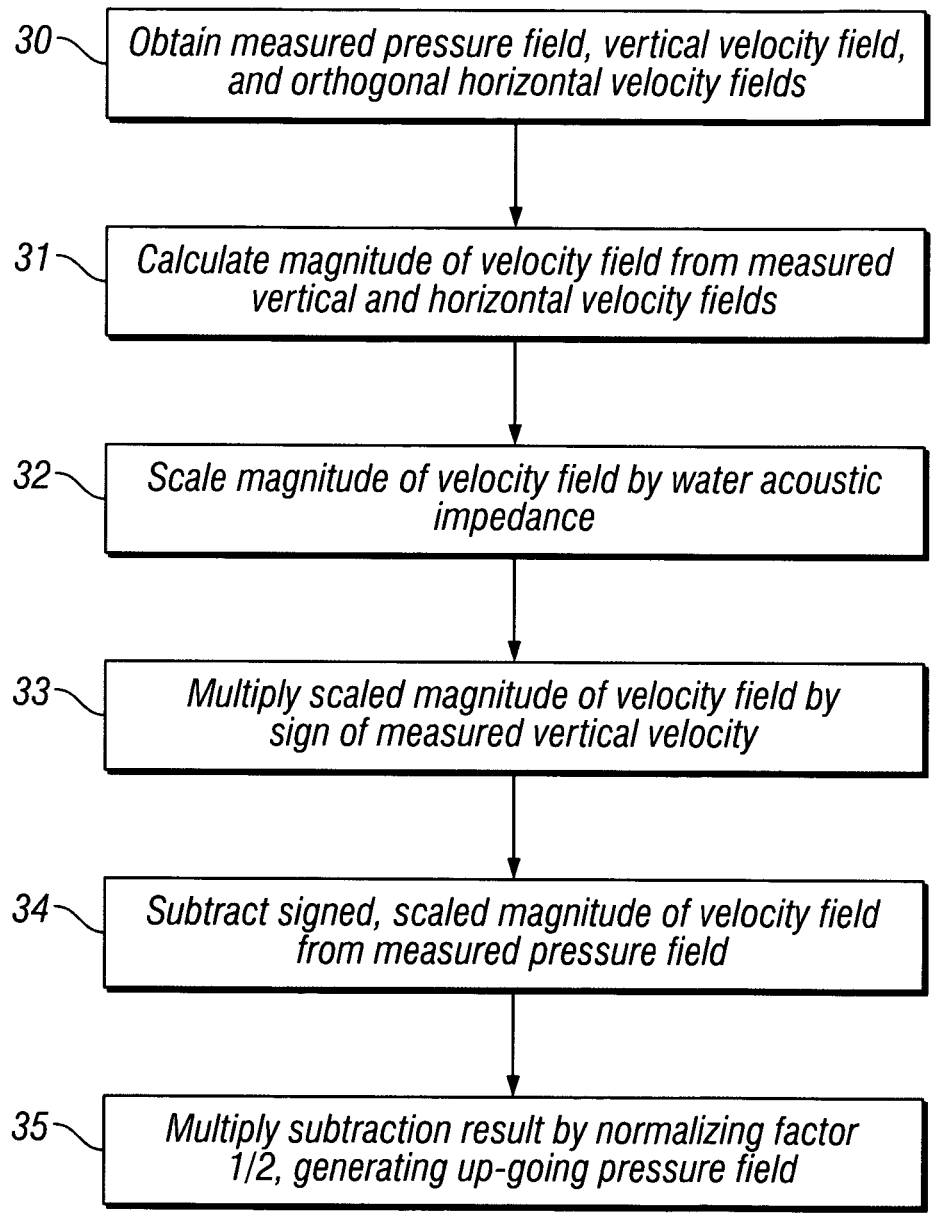
FIG. 3 is a flowchart illustrating an embodiment of the invention for determining an up-going pressure wavefield.

FIG. 3 is a flowchart illustrating an embodiment of the invention for determining an up-going pressure wavefield.

At block 30, a measured pressure field P, a measured vertical velocity field $V_z$, and two measured orthogonal horizontal velocity fields $V_x$ and $V_y$ are obtained.

At block 31, the magnitude $|V|$ of the velocity field $V=(V_x, V_y, V_z)$ is calculated from the measured velocity components $V_x$, $V_y$, and $V_z$, from block 30. The magnitude is the square root of the sum of the squared Cartesian components, as in Equation (13). This converts the directional components of the velocity field into an omni-directional velocity wavefield.

At block 32, the magnitude $|V|$ of the velocity field from block 31 is scaled by the water acoustic impedance $\rho c$. This equates the omni-directional velocity wavefield $|V|$ to the omni-directional pressure wavefield P.

At block 33, the scaled magnitude of the velocity field $\rho c |V|$ from block 32 is multiplied by sign $(V_z)$, either +1 or −1 corresponding to the sign of the measured vertical velocity field as given in Equation (15). This term brings the distinction between up-going wavefields (−1) and down-going wavefields (+1) back into the omni-directional wavefield.

Blocks 31 through 33 are equivalent to scaling the measured vertical velocity field $V_z$ from block 30 by the following scaling factor:

$$\frac{\rho c |V|}{|V_z|}, \tag{23}$$

as shown in Equation (18).

At block 34, the signed, scaled magnitude of the velocity field $\rho c$ sign $(V_z)|V|$ from block 33 is subtracted from the measured pressure field P from block 30.

At block 35, the subtraction result from block 34 is multiplied by normalizing factor ½. This generates the up-going pressure wavefield $P^u$ at the measurement position, as given in Equation (17).

The down-going pressure wavefield $P^d$ is obtained by following the same logic as in the flowchart in FIG. 3 and replacing the subtraction in block 34 with a summation, as given in Equation (19). This result is also equivalent to Equation (20).

Figure 4:
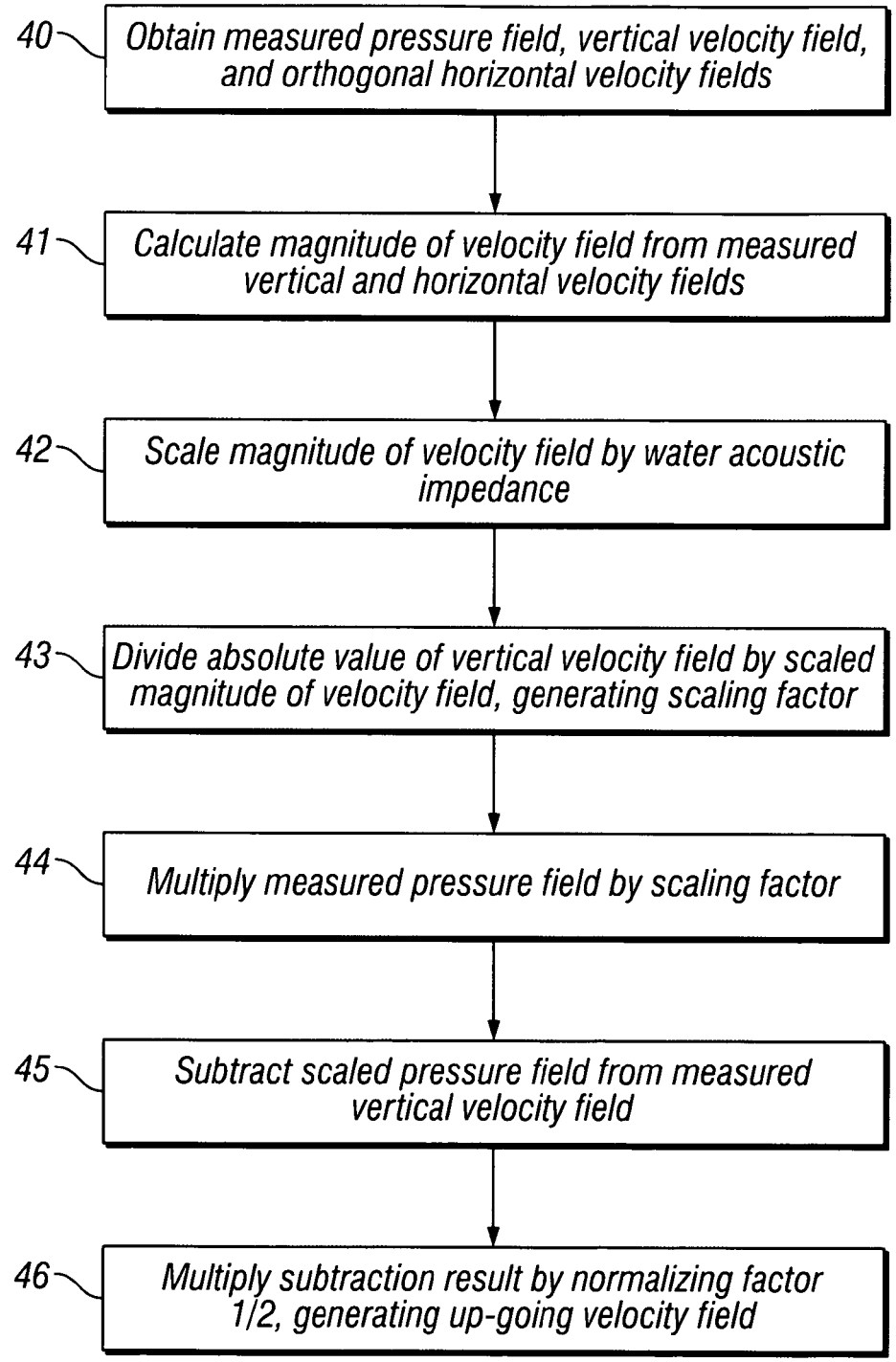
FIG. 4 is a flowchart illustrating an embodiment of the invention for determining an up-going velocity wavefield.

A similar process can be followed to obtain the down-going and up-going velocity wavefields $V^d$ and $V^u$, as given in Equations (21) and (22), respectively. FIG. 4 is a flowchart illustrating an embodiment of the invention for determining an up-going velocity wavefield.

At block 40, a measured pressure field P, a measured vertical velocity field $V_z$, and two measured orthogonal horizontal velocity fields $V_x$ and $V_y$ are obtained.

At block 41, the magnitude $|V|$ of the velocity field is calculated from the measured velocity components $V_x$, $V_y$, and $V_z$, from block 30. The absolute value is the square root of the sum of the squared Cartesian components, as in Equation (13).

At block 42, the magnitude $|V|$ of the velocity field from block 31 is scaled by the water acoustic impedance $\rho c$.

At block 43, the absolute value of the vertical velocity field $|V_z|$ from block 40 is divided by the magnitude $|V|$ of the velocity field scaled by the water acoustic impedance $\rho c$ from block 42. This generates the following scaling factor:

$$\frac{|V_z|}{\rho c |V|}. \tag{24}$$

At block 44, the scaling factor from block 43 is multiplied by the measured pressure field P from block 40.

At block 45, the scaled pressure field from block 44 is subtracted from the measured vertical velocity field $V_z$ from block 40.

At block 46, the subtraction result from block 45 is multiplied by normalizing factor ½. This generates the up-going velocity wavefield $V^u$ at the measurement position, as given in Equation (21).

The down-going velocity wavefield $V^d$ is obtained by following the same logic as in the flowchart in FIG. 4 and replacing the subtraction in block 45 with a summation, as given in Equation (22).

For increasing incidence angles or decreasing streamer tow depth, the accuracy of the wavefield separations in Equations (18), (20), (21), and (22) can be improved by the following embodiments of the invention, discussed here.

First, the limitations in the approach taken with reference to Equations (17) through (22) are discussed. The zero-order dynamic ray equation relates the amplitudes of the up-going and down-going pressure wavefields $P^u$ and $P^d$ to the amplitudes of the velocity components $V_x$, $V_y$, and $V_z$, and the unit slowness vector $\hat{p}$ by the following:

$$V_x = \frac{1}{Z}(P^d + P^u)\hat{p}_x \tag{25}$$

$$V_y = \frac{1}{Z}(P^d + P^u)\hat{p}_y \tag{26}$$

$$V_z = \frac{1}{Z}(P^d - P^u)\hat{p}_z \tag{27}$$

$$P = P^d + P^u. \tag{28}$$

Here, $$Z = \rho c \tag{29}$$

is acoustic impedance, where $\rho$ is density of water and c is local water velocity, and $$\hat{p} = (\hat{p}_x, \hat{p}_y, \hat{p}_z) \tag{30}$$

is the unit slowness vector and its Cartesian components.

From Equations (25), (26), and (27), the scaled and signed magnitude of the particle velocity vector used in Equations (17) and (19) (and as rewritten in Equations (18), (20), (21), and (22)) becomes:

$$Z \operatorname{sign}(V_z)|V| = \operatorname{sign}(V_z)|P^d - P^u| \sqrt{1 + \frac{4(\hat{p}_x^2 + \hat{p}_y^2)}{(P^d - P^u)^2} P^d P^u}. \tag{31}$$

If there is no overlap between up-going and down-going wavefields, then:

$$P^d P^u = 0, \tag{32}$$

and so Equation (31) reduces to:

$$Z \operatorname{sign}(V_z)|V| = (P^d - P^u). \tag{33}$$

Then, from Equation (33), the up-going pressure field $P^u$ in Equation (17) becomes:

$$\frac{1}{2}P - \frac{1}{2}Z\,\text{sign}(V_z)|V| = \frac{1}{2}(P^d + P^u) - \frac{1}{2}(P^d - P^u) = P^u. \quad (34)$$

Equation (34) shows that the wavefield separation approach introduced in Equation (18) gives a proper up-going pressure field $P^u$ only if the up- and down-going wavefields $P^u$ and $P^d$, respectively, do not overlap. A similar condition also holds for the wavefields in Equations (19) through (22).

Next, a further set of embodiments is discussed. In these embodiments, the scaling factor is expressed solely by the measured pressure field and the two orthogonal horizontal velocity fields (the vertical velocity field is replaced). By means of this new approach, inaccuracies are circumvented at high emergence angles and small towing depth, that is, where the up-going and down-going wavefields overlap, so:

$$P^d P^u \neq 0. \quad (35)$$

The up-going pressure field $P^u$ can be constructed accordingly from Equations (27) and (28) as:

$$P^u = \frac{1}{2}\left[P - \frac{Z}{\sqrt{1 - \frac{Z^2 V_x^2}{P^2} - \frac{Z^2 V_y^2}{P^2}}} V_z\right]. \quad (36)$$

Using Equations (25), (26), and (28), it can be seen that the second term in the right hand side of separation Equation (36) contains the angle-dependent scaling factor:

$$\frac{Z}{\sqrt{1 - \frac{Z^2 V_x^2}{P^2} - \frac{Z^2 V_y^2}{P^2}}} = \frac{Z}{\sqrt{1 - \hat{p}_x^2 - \hat{p}_y^2}} = \frac{\rho c}{\cos\theta}, \quad (37)$$

as in Equation (2). The wavefield separation expressed in Equation (36) again has no explicit angle dependency and is valid now for all incidence angles, with exception of horizontally propagating plane waves (angle $\theta = 90°$). Care is required in division by small numbers in the scaling factor computation in Equation (36).

Similarly, the down-going pressure field can be constructed as:

$$P^d = \frac{1}{2}\left[P + \frac{Z}{\sqrt{1 - \frac{Z^2 V_x^2}{P^2} - \frac{Z^2 V_y^2}{P^2}}} V_z\right], \quad (38)$$

analogous to Equation (3).

Figure 5:
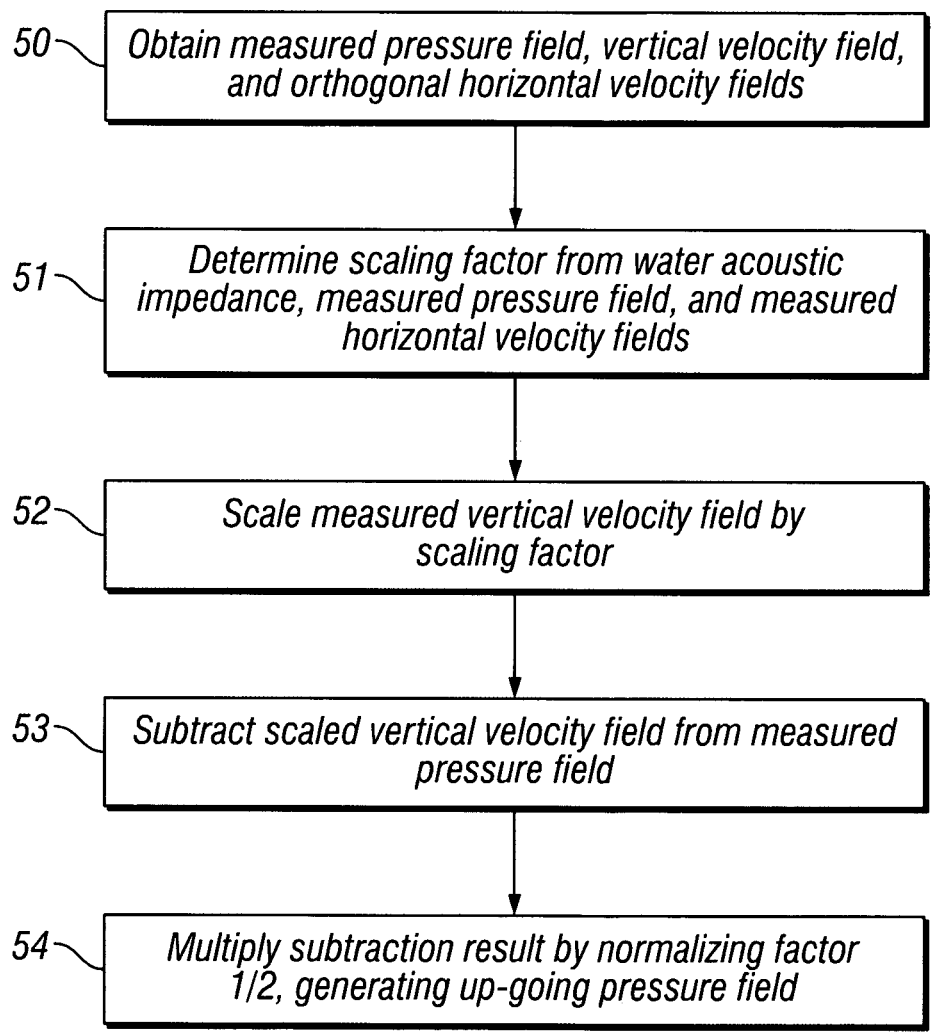
FIG. 5 is a flowchart illustrating a further embodiment of the invention for determining an up-going pressure wavefield.

FIG. 5 is a flowchart illustrating a further embodiment of the invention for determining an up-going pressure wavefield $P^u$. This process describes in more detail the method illustrated in Equation (36).

At block 50, a measured pressure field P, a measured vertical velocity field $V_z$, and two measured orthogonal horizontal velocity fields $V_x$ and $V_y$ are obtained.

At block 51, a scaling factor is determined from the water acoustic impedance $Z=\rho c$, the measured pressure field P from block 50, and the measured horizontal velocity fields $V_x$ and $V_y$, from block 50. The scaling factor is given by:

$$\frac{Z}{\sqrt{1 - \frac{Z^2 V_x^2}{P^2} - \frac{Z^2 V_y^2}{P^2}}}. \quad (39)$$

At block 52, the measured vertical velocity field $V_z$ from block 50 is scaled by the scaling factor from block 51.

At block 53, the scaled vertical velocity field from block 52 is subtracted from the measured pressure field P from block 50.

At block 54, the subtraction result from block 53 is multiplied by normalizing factor ½. This generates the up-going pressure wavefield $P^u$ at the measurement position, as given in Equation (36).

The down-going pressure wavefield $P^d$ is obtained by following the same logic as in the flowchart in FIG. 5 and replacing the subtraction in block 53 with a summation, as given in Equation (38).

Using the measured pressure field P and velocity fields $V_x$, $V_y$, and $V_z$, the up-going vertical velocity $V^u$ can be constructed from Equations (27) and (28) as:

$$V^u = \frac{1}{2}\left[V_z - \frac{\sqrt{1 - \frac{Z^2 V_x^2}{P^2} - \frac{Z^2 V_y^2}{P^2}}}{Z} P\right]. \quad (40)$$

Using Equations (25), (26), and (28), the second term in the right hand side of separation Equation (40) contains the angle-dependent scaling factor:

$$\frac{\sqrt{1 - \frac{Z^2 V_x^2}{P^2} - \frac{Z^2 V_y^2}{P^2}}}{Z} = \frac{\sqrt{1 - \hat{p}_x^2 - \hat{p}_y^2}}{Z} = \frac{\cos\theta}{\rho c}, \quad (41)$$

as in Equation (4).

Similarly, the down-going velocity field $V^d$ can be constructed as:

$$V^d = \frac{1}{2}\left[V_z + \frac{\sqrt{1 - \frac{Z^2 V_x^2}{P^2} - \frac{Z^2 V_y^2}{P^2}}}{Z} P\right], \quad (42)$$

analogous to Equation (5).

Figure 6:
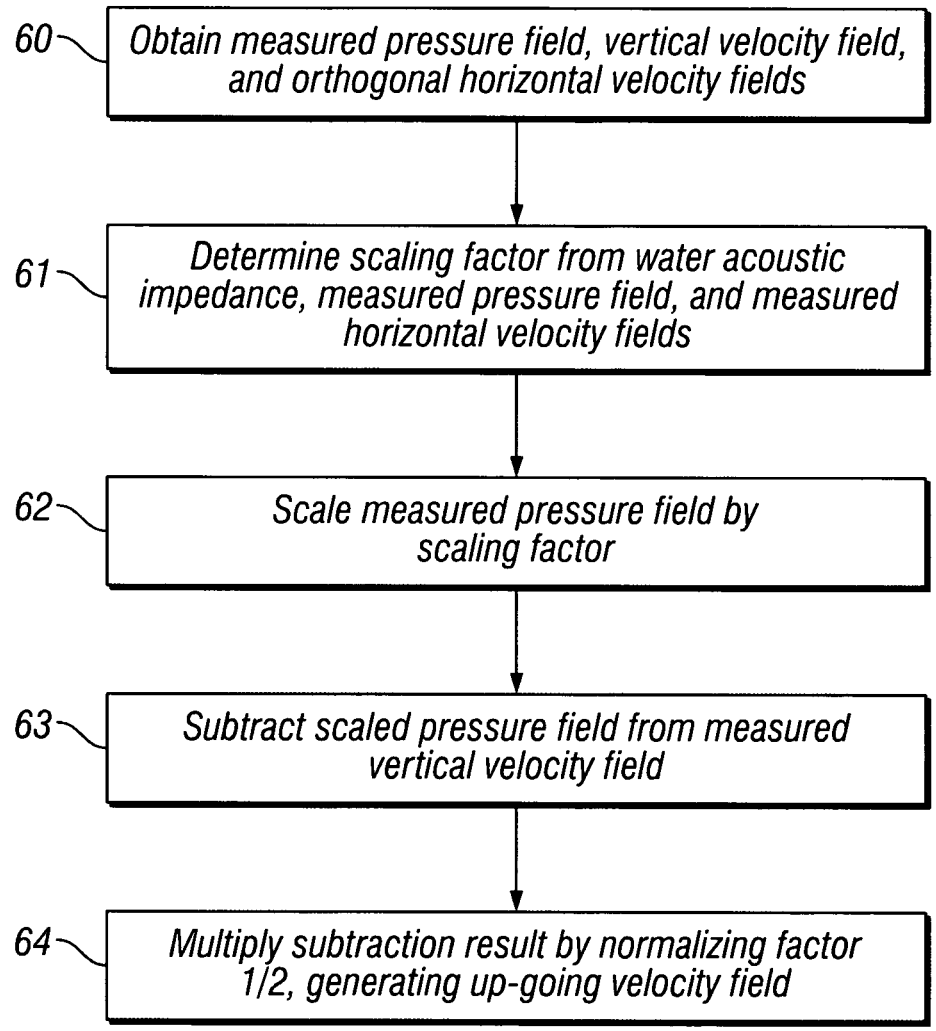
FIG. 6 is a flowchart illustrating a further embodiment of the invention for determining an up-going velocity wavefield.

FIG. 6 is a flowchart illustrating a further embodiment of the invention for determining an up-going velocity wavefield $V^u$. This process describes in more detail the method illustrated in Equation (40).

At block 60, a measured pressure field P, a measured vertical velocity field $V_z$, and two measured orthogonal horizontal velocity fields $V_x$ and $V_y$ are obtained.

At block 61, a scaling factor is determined from the water acoustic impedance $Z=\rho c$, the measured pressure field P from block 60, and the measured horizontal velocity fields $V_x$ and $V_y$, from block 60. The scaling factor is given by:

$$\frac{\sqrt{1 - \frac{Z^2 V_x^2}{P^2} - \frac{Z^2 V_y^2}{P^2}}}{Z}. \tag{43}$$

At block 62, the measured pressure field P from block 60 is scaled by the scaling factor from block 61.

At block 63, the scaled pressure field from block 62 is subtracted from the measured vertical velocity wavefield $V_z$ from block 60.

At block 64, the subtraction result from block 63 is multiplied by normalizing factor ½. This generates the up-going velocity wavefield $V^u$ at the measurement position, as given in Equation (40).

The down-going velocity wavefield $V^d$ is obtained by following the same logic as in the flowchart in FIG. 6 and replacing the subtraction in block 63 with a summation, as given in Equation (42).

The method of the invention provides wavefield separation based on multi-component (three-axial) particle velocity measurement. The angle-dependent scaling needed for wavefield separation is automatically obtained from the pressure field and horizontal components of the particle velocity field. From the pressure and three measured Cartesian components of the particle velocity vector, the wavefield separation is computed locally in the time-space domain and without knowledge of event angles in the common source wavefields. This relaxes the dense spatial sampling assumption and the requirement for incidence angle information. The wavefield separation method of the invention does not need any user intervention and thus may be applied in data processing centers or on the seismic vessel as one of the preprocessing steps.

The method of the invention is most accurate when not encumbered by amplitude treatment in caustics (i.e., crossing of multiple events) by the geometrical ray approximation.

In another embodiment some processing operations may be applied to the acquired multi-component data prior to the wavefield separation. In order to exemplify some possible operations which would not affect the quality of the wavefield separation of the invention, the measured data, $V_x$, $V_y$, $V_z$, P, are assumed to comprise an arbitrarily dipping, curved event. Then, a space and time variant invertible scaling function $\lambda(x,y,t)$ is first applied. The process of wavefield separation from Equation (36) becomes:

$$\lambda P^u = \frac{1}{2}\left[\lambda P - \frac{Z}{\sqrt{1 - \frac{Z^2 \lambda^2 V_x^2}{\lambda^2 P^2} - \frac{Z^2 \lambda^2 V_y^2}{\lambda^2 P^2}}} \lambda V_z\right], \tag{44}$$

which is identical to an up-going wavefield $P^u$ multiplied by the scaling function $\lambda(x,y,t)$. After removing the scaling function, the original up-going wavefield $P^u$ is recovered.

In yet another embodiment, the measured wavefields $V_x$, $V_y$, $V_z$, and P could be filtered with an arbitrary invertible filter F(t) prior to insertion into Equation (36). From Equations (25), (26), and (28), the following is obtained by convenient factoring:

$$F * P^u = \frac{1}{2}\left[F * P - \frac{Z}{\sqrt{1 - \frac{Z^2(F*V_x)^2}{(F*P)^2} - \frac{Z^2(F*V_y)^2}{(F*P)^2}}} F * V_z\right] \tag{45}$$

$$= \frac{1}{2}\left[F * P - \frac{Z}{\sqrt{1 - \frac{\hat{p}_x^2(F*(P^u+P^d))^2}{(F*(P^u+P^d))^2} - \frac{\hat{p}_y^2(F*(P^u+P^d))^2}{(F*(P^u+P^d))^2}}} F * V_z\right],$$

where * designates convolution. Equation (45) is now identical to a filtered up-going pressure field. The original unfiltered up-going pressure field may be recovered by applying an appropriate inverse filter to the filter F. This filter application is equally valid for two and three dimensional filters, F(x,t), with x=x or x=x(x,y).

Some one-dimensional filters describe common data processing steps, such as, for example, moveout. Moveout includes linear moveout (LMO), normal moveout (NMO), and data stretch. The filter application is also equally valid for two and three dimensional filters, F(x,t). These processing steps may run prior to the wavefield separation of Equations (36), (38), (40), and (42).

Some two- or three-dimensional filters describe the process of moving and changing the dip of seismic events in the two or three dimensional space. One such filter, combined with a scaling factor, describes the process of NMO stacking. Stacking may be run prior to the wavefield separation of Equations (36), (38), (40), and (42).

One other type of filter, combined with a scaling factor, describes the process of migration. Migration can be run prior to the wavefield separation of Equations (36), (38), (40), and (42).

In another embodiment, crossing events may be separated by applying available tools of multi-channel multi-component filtering prior to wavefield separation.

In yet another embodiment, which goes beyond the ray theoretical limitations, the separation of crossing events may be achieved by transforming the measured wavefields $V_x$, $V_y$, $V_z$, and P to the temporal and spatial frequency domain by applying Fourier transforms prior to insertion into Equation (36). From Equations (25), (26), and (28), and with the exact relation:

$$-\nabla P = i\omega\rho V \tag{46}$$

between pressure and particle velocity in homogeneous acoustic media, the following is obtained by convenient factoring:

$$FT(P^u) = \frac{1}{2}\left\{FT(P) - \frac{Z}{\sqrt{1 - \frac{|FT(ZV_x)|^2}{|FT(P)|^2} - \frac{|FT(ZV_y)|^2}{|FT(P)|^2}}} FT(V_z)\right\} \tag{47}$$

$$= \frac{1}{2}\left\{\frac{FT(P) - Z}{\sqrt{1 - \frac{\left|\frac{ck_x}{\omega}(\tilde{P}^u+\tilde{P}^d)\right|^2}{|\tilde{P}^u+\tilde{P}^d|^2} - \frac{\left|\frac{ck_y}{\omega}(\tilde{P}^u+\tilde{P}^d)\right|^2}{|\tilde{P}^u+\tilde{P}^d|^2}}} FT(V_z)\right\},$$

where tilde designates Fourier transformed (FT) quantities and | | designates absolute value (modulus) of complex quantities. The result of Equation (47) is identical to a Fourier transformed up-going wavefield, FT($P^u$), which is not restricted to ray approximation. Any zero by zero divisions in the Fourier domain are removed by techniques known in the art. The process given by Equation (47) resembles the scaling given in Equations (6) and (7) for the conventional wavefield separation in the frequency-wavenumber ($\omega$-$k_x$-$k_y$) domain. Although the scaling is computed differently, the equivalence is shown by premultiplying both the nominator and denominator by $\omega/c$ in Equation (47). The original up-going pressure field $P^u$ may be recovered by applying an appropriate inverse Fourier transform to FT($P^u$).

Of particular interest is a combined approach comprising conventional inline scaling (for example, in a $\omega$-$k_x$ domain) and a cross-line angles determination from cross-line motion sensors as in the method of the invention. In this case only one horizontal component is needed in addition to the pressure field and vertical velocity field properly sampled in the inline direction.

In another embodiment, the method of wavefield separation according to the invention, as described in Equations (36), (38), (40), and (42), may also be extended to handle complex seismic traces in time. Complex traces are calculated from real measured traces by using the Hilbert Transform.

The invention has been discussed above as a method, for illustrative purposes only, but can also be implemented as a system. The system of the invention is preferably implemented by means of computers, in particular digital computers, along with other conventional data processing equipment. Such data processing equipment, well known in the art, will comprise any appropriate combination or network of computer processing equipment, including, but not be limited to, hardware (processors, temporary and permanent storage devices, and any other appropriate computer processing equipment), software (operating systems, application programs, mathematics program libraries, and any other appropriate software), connections (electrical, optical, wireless, or otherwise), and peripherals (input and output devices such as keyboards, pointing devices, and scanners; display devices such as monitors and printers; computer readable storage media such as tapes, disks, and hard drives, and any other appropriate equipment).

In another embodiment, the invention could be implemented as the method described above, specifically carried out using a programmable computer to perform the method. In another embodiment, the invention could be implemented as a computer program stored in a computer readable medium, with the program having logic operable to cause a programmable computer to perform the method described above. In another embodiment, the invention could be implemented as a computer readable medium with a computer program stored on the medium, such that the program has logic operable to cause a programmable computer to perform the method described above.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

We claim:

1. A method for separating pressure and vertical velocity fields measured in towed streamers into up-going and down-going wavefields, comprising:

obtaining a measured pressure field, a measured vertical velocity field, and two measured orthogonal horizontal velocity fields; and using a programmable computer to perform the following:

determining a scaling factor as a function of water acoustic impedance, the measured pressure field, and the measured horizontal velocity fields;

scaling one of the measured pressure field and the measured vertical velocity field by the scaling factor; and combining one of the measured pressure field and measured vertical velocity field with one of the scaled vertical velocity field and the scaled pressure field, generating one of up-going and down-going pressure and velocity wavefields.

2. The method of claim 1, wherein the determining a scaling factor and the scaling comprises:

calculating the magnitude |V| of the velocity field from the measured velocity components $V_x$, $V_y$, $V_z$;

scaling the magnitude |V| of the velocity field by the water acoustic impedance $\rho c$; and multiplying the scaled magnitude of the velocity field $\rho c$|V| by sign ($V_z$).

3. The method of claim 2, wherein the combining comprises:

subtracting the signed, scaled magnitude of the velocity field $\rho c$ sign($V_z$) |V| from the measured pressure field P, generating a subtraction result; and multiplying the subtraction result by normalizing factor ½, generating the up-going pressure wavefield.

4. The method of claim 1, wherein the determining a scaling factor and the scaling comprise:

scaling the measured vertical velocity field $V_z$ by the scaling factor:

$$\frac{\rho c |V|}{|V_z|},$$

where $\rho$ is water density and c is local water velocity, |V| is magnitude of the velocity field $V=(V_x, V_x, V_y, V_z)$, and |$V_z$| is absolute value of the measured vertical velocity field $V_z$.

5. The method of claim 4, wherein the combining comprises:

subtracting the scaled vertical velocity field from the measured pressure field P, generating a subtraction result; and multiplying the subtraction result by normalizing factor ½, generating the up-going pressure wavefield.

6. The method of claim 4, wherein the combining comprises:

adding the scaled vertical velocity field to the measured pressure field P, generating a summation result; and multiplying the summation result by normalizing factor ½, generating the down-going pressure wavefield.

7. The method of claim 1, wherein the determining a scaling factor and the scaling comprise:
scaling the measured pressure field P by the scaling factor:

$$\frac{|V_z|}{\rho c |V|},$$

where $|V_z|$ is absolute value of the measured vertical velocity field $V_z$, $\rho$ is water density and c is local waver velocity, and $|V|$ is magnitude of the velocity field $V=(V_x, V_y, V_z)$.

8. The method of claim 7, wherein the combining comprises:
subtracting the scaled pressure field from the measured vertical velocity field $V_z$, generating a subtraction result; and
multiplying the subtraction result by normalizing factor ½, generating the up-going velocity wavefield.

9. The method of claim 7, wherein the combining comprises:
adding the scaled pressure field to the measured vertical velocity field $V_z$, generating a summation result; and
multiplying the summation result by normalizing factor ½, generating the down-going velocity wavefield.

10. The method of claim 1, wherein the determining a scaling factor and the scaling comprise:
scaling the measured vertical velocity field $V_z$ by the scaling factor:

$$\frac{Z}{\sqrt{1 - \frac{Z^2 V_x^2}{P^2} - \frac{Z^2 V_y^2}{P^2}}}$$

where $Z=\rho c$ is water acoustic impedance, $\rho$ is water density, c is local water velocity, $V_x$ and $V_y$ are the measured horizontal velocity fields, and P is the measured pressure field.

11. The method of claim 10, wherein the combining comprises:
subtracting the scaled vertical velocity field from the measured pressure field P, generation a subtraction result; and
multiplying the subtraction result by normalizing factor ½, generating the up-going pressure wavefield.

12. The method of claim 10, wherein the combining comprises:
adding the scaled vertical velocity field to the measured pressure field P, generating a summation result; and
multiplying the summation result by normalizing factor ½, generating the down-going pressure wavefield.

13. The method of claim 1, wherein the determining a scaling factor and the scaling comprise:
scaling the measured pressure field P by the scaling factor:

$$\frac{\sqrt{1 - \frac{Z^2 V_x^2}{P^2} - \frac{Z^2 V_y^2}{P^2}}}{Z},$$

where $Z=\rho c$ is water acoustic impedance, $\rho$ is water density, c is local water velocity, $V_x$ and $V_y$ are the measured horizontal velocity fields, and P is the measured pressure field.

14. The method of claim 13, wherein the combining comprises:
subtracting the scaled pressure field from the measured vertical velocity field $V_z$, generating a subtraction result; and
multiplying the subtraction result by normalizing factor ½, generating the up-going velocity wavefield.

15. The method of claim 13, wherein the combining comprises:
adding the scaled pressure field to the measured vertical velocity field Vz, generating a summation result; and
multiplying the summation result by normalizing factor ½, generating the down-going velocity wavefield.

16. The method of claim 1, wherein the combining comprises:
applying the following equation:

$$\lambda P^u = \frac{1}{2}\left[\lambda P - \frac{Z}{\sqrt{1 - \frac{Z^2 \lambda^2 V_x^2}{\lambda^2 P^2} - \frac{Z^2 \lambda^2 V_y^2}{\lambda^2 P^2}}} \lambda V_z\right],$$

where $\lambda$ is a space and time variant invertible scaling function, $P^u$ is the up-going pressure wavefield, P is the measure pressure field, $Z=\rho c$ is water acoustic impedance, $\rho$ is water density, c is local water velocity, $V_x$, and $V_y$ are the measured horizontal velocity fields, and $V_x$, is the measured vertical velocity field; and
removing the scaling function $\lambda$ from the product $P^u$.

17. The method of claim 1, wherein the combining comprises:
applying the following equation:

$$F * P^u = \frac{1}{2}\left[F * P - \frac{Z}{\sqrt{1 - \frac{Z^2 (F*V_x)^2}{(F*P)^2} - \frac{Z^2 (F*V_y)^2}{(F*P)^2}}} F * V_z\right],$$

where F is an invertible filter, $P^u$ is the up-going pressure wavefield, P is the measured pressure field, $Z=\rho c$ is water acoustic impedance, $\rho$ is water density, c is local water velocity, $V_x$ and $V_y$ are the measured horizontal velocity fields, and $V_z$ is the measured vertical velocity field; and
applying an inverse filter for the filter F to the convolution F*P.

18. The method of claim 17, wherein the filter comprises normal moveout stacking.

19. The method of claim 17, wherein the filter comprises migration.

20. The method of claim 1, wherein the combining comprises:
applying the following equation:

$$FT(P^u) = \frac{1}{2}\left\{FT(P) - \frac{Z}{\sqrt{1 - \frac{|FT(ZV_x)|^2}{|FT(P)|^2} - \frac{|FT(ZV_y)|^2}{|FT(P)|^2}}} FT(V_z)\right\},$$

where FT is a Fourier transform, $P^u$ is the up-going pressure wavefield, P is the measured pressure field, $Z=\rho c$ is water acoustic impedance, $\rho$ is water density, c is local water velocity, $V_x$ and $V_y$ are the measured horizontal velocity fields, and $V_z$ is the measured vertical velocity field; and applying an inverse Fourier transform to the transformed up-going pressure wavefield $FT(P^u)$.

21. The method of claim 1, wherein the measured pressure and velocity fields comprise complex seismic traces calculated from measured real seismic traces using a Hilbert transform.

22. The method of claim 1, wherein the obtaining and the determining comprise:
   obtaining a measured pressure field, a measured vertical velocity field, and a measured cross-line horizontal velocity field; and
   determining a scaling factor as a function of water acoustic impedance, the measured pressure field, and the measured cross-line horizontal velocity fields.

23. A non-transitory computer readable medium with a computer program stored thereon, the program having logic operable to perform steps comprising:
   receiving a measured pressure field, a measured vertical velocity field, and two measured orthogonal horizontal velocity fields from computer readable storage;
   determining a scaling factor as a function of water acoustic impedance, the measured pressure field, and the measured horizontal velocity fields;
   scaling one of the measured pressure field and the measured vertical velocity field by the scaling factor; and
   combining one of the measured pressure field and measured vertical velocity field with one of the scaled vertical velocity field and the scaled pressure field, generating one of up-going and down-going pressure and velocity wavefields.

24. The medium of claim 23, wherein the determining a scaling factor and the scaling comprises:
   calculating the magnitude $|V|$ of the velocity field from the measured velocity components $V_x$, $V_y$, and $V_z$;
   scaling the magnitude $|V|$ of the velocity field by the water acoustic impedance $\rho c$; and
   multiplying the scaled magnitude of the velocity field $\rho c |V|$ by sign $(V_z)$.

25. The medium of claim 24, wherein the combining comprises:
   subtracting the signed, scaled magnitude of the velocity field $\rho c$ sign $V_z |V|$ from the measured pressure field P, generating a subtraction result; and
   multiplying the subtraction result by normalizing factor ½, generating the up-going pressure wavefield.

26. The medium of claim 23, wherein the determining a scaling factor and the scaling comprise:
   scaling the measured vertical velocity field $V_z$, by the scaling factor:

$$\frac{\rho c |V|}{|V_z|},$$

where $\rho$ is water density and c is local water velocity, $|V|$ is magnitude of the velocity field $V=(V_x, V_y, V_z)$, and $|V_z|$ is absolute value of the measured vertical velocity field $V_z$.

27. The medium of claim 26, wherein the combining comprises:
   subtracting the scaled vertical velocity field from the measured pressure field P, generating a subtraction result; and
   multiplying the subtraction result by normalizing factor ½, generating the up-going pressure wavefield.

28. The medium of claim 26, wherein the combining comprises:
   adding the scaled vertical velocity field to the measured pressure field P, generating a summation result; and
   multiplying the summation result by normalizing factor ½, generating the down-going pressure wavefield.

29. The medium of claim 23, wherein the determining a scaling factor and the scaling comprise:
   scaling the measured pressure field P by the scaling factor:

$$\frac{|V_z|}{\rho c |V|},$$

where $|V_z|$ is absolute value of the measured vertical velocity field $V_z$, $\rho$ is water density and c is local water velocity, and $|V|$ is magnitude of the velocity field $V=(V_x, V_y, V_z)$.

30. The medium of claim 29, wherein the combining comprises:
   subtracting the scaled pressure field from the measured vertical velocity field $V_z$, generating a subtraction result; and
   multiplying the subtraction result by normalizing factor ½, generating the up-going velocity wavefield.

31. The medium of claim 29, wherein the combining comprises:
   adding the scaled pressure field to the measured vertical velocity field $V_z$, generating a summation result; and
   multiplying the summation result by normalizing factor ½, generating the down-going velocity wavefield.

32. The medium of claim 23, wherein the determining a scaling factor and the scaling comprise:
   scaling the measured vertical velocity field $V_z$ by the scaling factor:

$$\frac{Z}{\sqrt{1 - \frac{Z^2 V_x^2}{P^2} - \frac{Z^2 V_y^2}{P^2}}},$$

where $Z=\rho c$ is water acoustic impedance, $\rho$ is water density, c is local water velocity, $V_x$ and $V_y$ are the measured horizontal velocity fields, and P is the measured pressure field.

33. The medium of claim 32, wherein the combining comprises:
   subtracting the scaled vertical velocity field from the measured pressure field P, generating a subtraction result; and
   multiplying the subtraction result by normalizing factor ½, generating the up-going pressure wavefield.

34. The medium of claim 32, wherein the combining comprises:
   adding the scaled vertical velocity field to the measured pressure field P, generating a summation result; and
   multiplying the summation result by normalizing factor ½, generating the down-going pressure wavefield.

35. The medium of claim 23, wherein the determining a scaling factor and the scaling comprise:

scaling the measured pressure field P by the scaling factor:

$$\frac{\sqrt{1 - \frac{Z^2 V_x^2}{P^2} - \frac{Z^2 V_y^2}{P^2}}}{Z},$$

where $Z=\rho c$ is water acoustic impedance, $\rho$ is water density, c is local water velocity, $V_x$ and $V_y$ are the measured horizontal velocity fields, and P is the measured pressure field.

36. The medium of claim 35, wherein the combining comprises:

subtracting the scaled pressure field from the measured vertical velocity field $V_z$, generating a subtraction result; and multiplying the subtraction result by normalizing factor ½, generating the up-going velocity wavefield.

37. The medium of claim 35, wherein the combining comprises:

adding the scaled pressure field to the measured vertical velocity field $V_z$, generating a summation result; and multiplying the summation result by normalizing factor ½, generating the down-going velocity wavefield.

38. The medium of claim 23, wherein the combining comprises:

applying the following equation:

$$\lambda P^u = \frac{1}{2}\left[\lambda P - \frac{Z}{\sqrt{1 - \frac{Z^2 \lambda^2 V_x^2}{\lambda^2 P^2} - \frac{Z^2 \lambda^2 V_y^2}{\lambda^2 P^2}}} \lambda V_z\right],$$

where $\lambda$ is a space and time variant invertible scaling function, $P^u$ is the up-going pressure wavefield, P is the measured pressure field, $Z=\rho c$ is water acoustic impedance, $\rho$ is water density, c is local water velocity, $V_x$, and $V_y$ are the measured horizontal velocity fields, and $V_z$ is the measured vertical velocity field; and removing the scaling function $\lambda$ from the product $\lambda P^u$.

39. The medium of claim 23, wherein the combining comprises:

applying the following equation:

$$F * P^u = \frac{1}{2}\left[F * P - \frac{Z}{\sqrt{1 - \frac{Z^2(F*V_x)^2}{(F*P)^2} - \frac{Z^2(F*V_y)^2}{(F*P)^2}}} F * V_z\right],$$

where F is an invertible filter, $P^u$ is the up-going pressure wavefield, P is the measured pressure field, $Z=\rho c$ is water acoustic impedance, $\rho$ is water density, c is local water velocity, $V_x$ and $V_y$ are the measured horizontal velocity fields, and $V_z$, is the measured vertical velocity field; and applying an inverse filter for the filter F to the convolution $F*P^u$.

40. The medium of claim 39, wherein the filter comprises normal moveout stacking.

41. The medium of claim 39, wherein the filter comprises migration.

42. The medium of claim 23, wherein the combining comprises:

applying the following equation:

$$FT(P^u) = \frac{1}{2}\left\{FT(P) - \frac{Z}{\sqrt{1 - \frac{|FT(ZV_x)|^2}{|FT(P)|^2} - \frac{|FT(ZV_y)|^2}{|FT(P)|^2}}} FT(V_z)\right\},$$

where FT is a Fourier transform, $P^u$ is the up-going pressure wavefield, P is the measured pressure field, $Z=\rho c$ is water acoustic impedance, $\rho$ is water density, c is local water velocity, $V_x$ and $V_y$ are the measured horizontal velocity fields, and $V_z$ is the measured vertical velocity field; and applying an inverse Fourier transform to the transformed up-going pressure wavefield $FT(P^u)$.

43. The medium of claim 23, wherein the measured pressure and velocity fields comprise complex seismic traces calculated from measured real seismic traces using a Hilbert transform.

44. The medium of claim 23, wherein the obtaining and the determining comprise:

obtaining a measured pressure field, a measured vertical velocity field, and a measured cross-line horizontal velocity field; and determining a scaling factor as a function of water acoustic impedance, the measured pressure field, and the measured cross-line horizontal velocity fields.

* * * * *